United States Patent [19]
Blakemore

[11] 3,750,485
[45] Aug. 7, 1973

[54] INFINITELY VARIABLE POSITIVE MECHANICAL TRANSMISSION
[76] Inventor: John H. Blakemore, Oak Park, Ill.
[22] Filed: Sept. 16, 1971
[21] Appl. No.: 180,983

[52] U.S. Cl..................................... 74/125.5, 74/63
[51] Int. Cl............................................ F16d 21/10
[58] Field of Search..................... 74/125.5, 63, 568; 192/41 S

[56] References Cited
UNITED STATES PATENTS

| | | | |
|---|---|---|---|
| 1,872,636 | 8/1932 | Greening et al. | 74/63 |
| 1,991,820 | 2/1935 | Rafting | 74/125.5 |
| 2,493,418 | 1/1950 | Orshansky, Jr. | 74/125.5 |
| 3,448,627 | 6/1969 | Brooks | 74/125.5 |
| 3,490,299 | 1/1970 | Binner | 74/125.5 |
| 3,499,347 | 3/1970 | Pearson | 74/568 |

*Primary Examiner*—Charles J. Myhre
*Assistant Examiner*—Wesley S. Ratliff, Jr.
*Attorney*—Marshall A. Burmeister et al.

[57] ABSTRACT

A positive drive mechanical transmission providing infinite variations of output speed relative to input speed and comprising an output member driven continuously by one or another of a plurality of one-way clutches connected in parallel with each other and driven in synchronism but in phase displacement to each other by a corresponding plurality of mechanical oscillators of infinitely variable angular displacement which are continuously driven by an input driving member. The mechanical oscillators are powered by cams which can be shaped through design to assure through the intervening one-way clutches a constant speed actuation of the driven member, the drive through the several one-way clutches actuated by the corresponding mechanical oscillators being overlapping to the end that the driving connection between the transmission input member and the transmission output member is positive and continuous.

11 Claims, 8 Drawing Figures

Inventor:
John H. Blakemore
By:
Burmeister, Palmatier & Hamby
Attys

INFINITELY VARIABLE POSITIVE MECHANICAL TRANSMISSION

This invention relates to transmissions designed to mechanically drive a rotary output member at an infinitely variable speed in relation to the rotary speed of a driving member. A mechanical transmission capable of rotating a driven member at an infinitely variable speed in relation to a driving member has many potential advantages in a wide spectrum of applications. However, the designing and production of a workable transmission of this character has presented many challenging and interrelated problems which heretofore have not been resolved in prior transmissions.

The problems and shortcomings commonly associated with previous transmission designed to drive a rotary output member at an infinitely variable speed in relation to that of a rotary input member have included susceptibility of the working parts to wear with consequent shortened service life of the transmission units, low power transmitting capacity, and discontinuities and nonuniformities in the supply of power to the driven member.

In general, the design and construction of conventional transmissions of this general character have been plagued with serious and multitudinous shortcomings and practical disadvantages with the consequence that resort is often made to the use of rather expensive, bulky and inefficient hydraulic and electrical drives in installations where it is desirable to provide an infinite variation in the relative speed of a rotary driven member to a rotary input drive.

One object of the present invention is to provide for turning a rotary output member at an infinitely variable speed, in relation to the rotary speed of an input driving member, a new and improved mechanical transmission which provides between the rotary input member and the rotary output member a positive mechanical drive that is maintained continuously without any slippage of the working parts in relation to each other and without any energy loss or heating incident to the achievement of the change in speed as such of the output member in relation to that of the input member.

A further object is to provide a transmission as recited in the preceding object in which a continuous mechanical drive of infinitely variable speed ratio is provided through the transmission by working parts well suited by design to transmit power within wide power ranges so that such transmissions have an inherent suitability for use in many different applications to great advantage.

Another object is to provide a purely mechanical transmission of the foregoing character which permits an infinitely variable adjustment of the speed ratio through the transmission, the range within which the speed is infinitely variable including a zero output speed.

Another object is to provide a new and improved variable speed transmission as recited in the preceding objects in which a continuous mechanical drive is provided between a rotary input member and a rotary output member through a plurality of one-way clutches connected in tandem between the rotary output member and a plurality of variable excursion mechanical oscillators shifted in phase in relation to each other and driven in synchronism by the rotary input member.

A further object is to provide a new and improved mechanical transmission in which a continuous mechanical drive through the transmission is effected by means of driving cams working in sequence and being shaped through design to provide through the cams a continuous mechanical drive to the driven member at a constant speed with the consequent practical avoidance of pulsations in the speed and power transmitted from the driving member to the driven member.

A further object is to provide a transmission as recited in the preceding object in which the design of the transmission provides for precise control and uniformity in the continuous transmission of power at a constant speed to the driven member, by virtue of a precise individualized shaping through design of the driving cams.

Other objects and advantages will become apparent from the following description of the exemplary embodiments of the invention illustrated in the drawings, in which.

Referring now to the drawings in greater detail, the transmission unit 20 illustrated in FIGS. 1 through 6, operates, as will presently appear, to mechanically transmit continuously power between a rotary driving member 22 and a rotary driven member 24 and at the same time provides controllably for varying the speed of the driven member 24 in relation to the speed of the driving member 22 infinitely through a wide and highly practical speed range which includes a zero output speed for the driven member while the driving member 22 is turning continuously.

As will be explained in detail, the driven member or shaft 24 is driven continuously through one or another of a plurality of one-way clutches 26, three being used in the transmission unit 20, connected in parallel between the driven output member or shaft 24 and a corresponding plurality of variable excursion mechanical actuators denoted generally by the number 28 and continuously driven in synchronism by the rotating input member 22 and being displaced in phase relative to each other.

Figure 1:
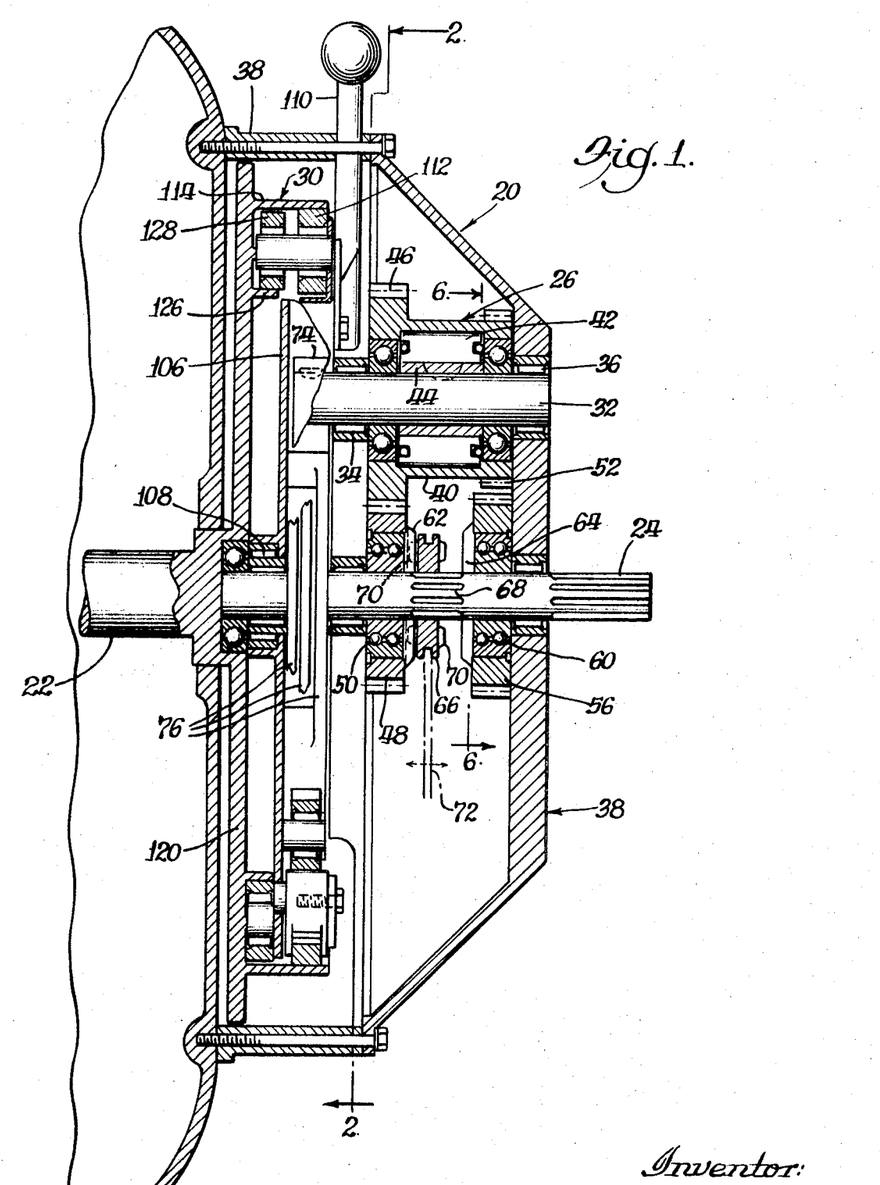
FIG. 1 is a longitudinal sectional view of an infinitely variable ratio positive drive mechanical transmission incorporating the invention.
Figure 2:
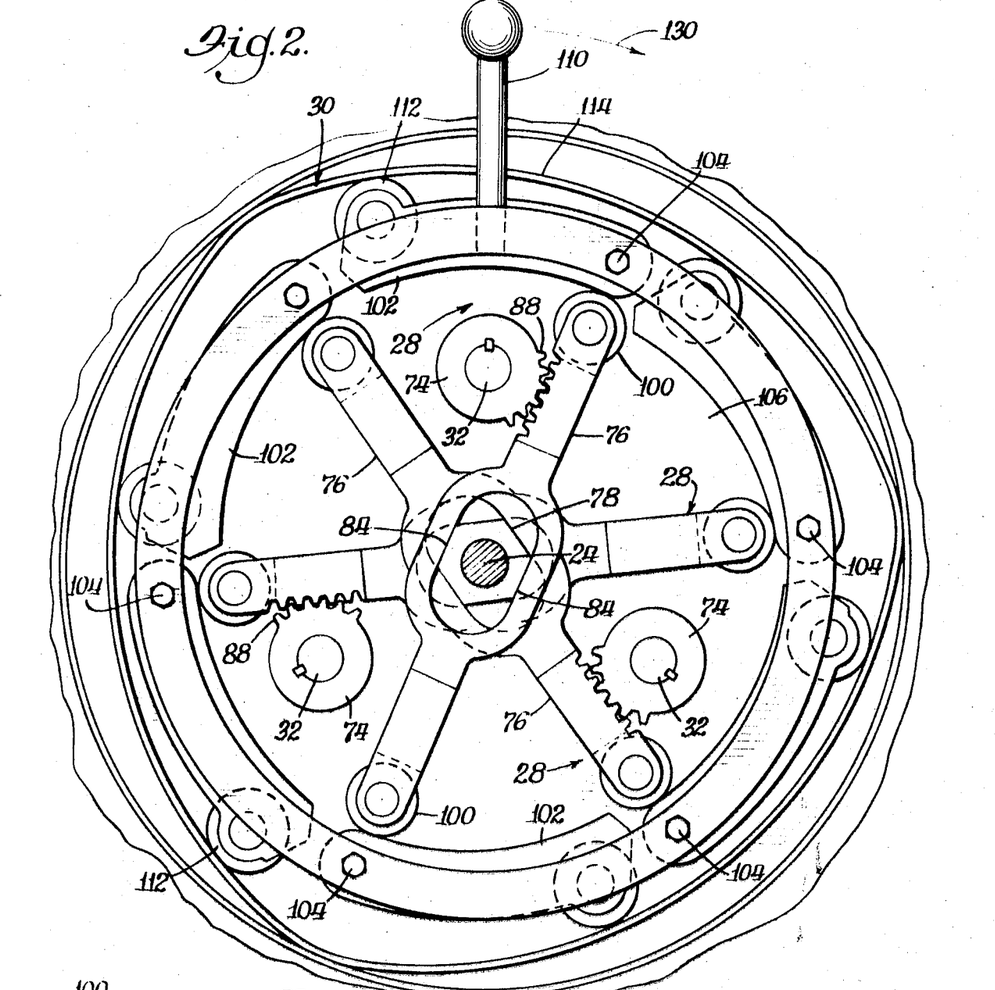
FIG. 2 is a transverse sectional view of the transmission taken generally with reference to the line 2—2 of FIG. 1.
Figure 5:
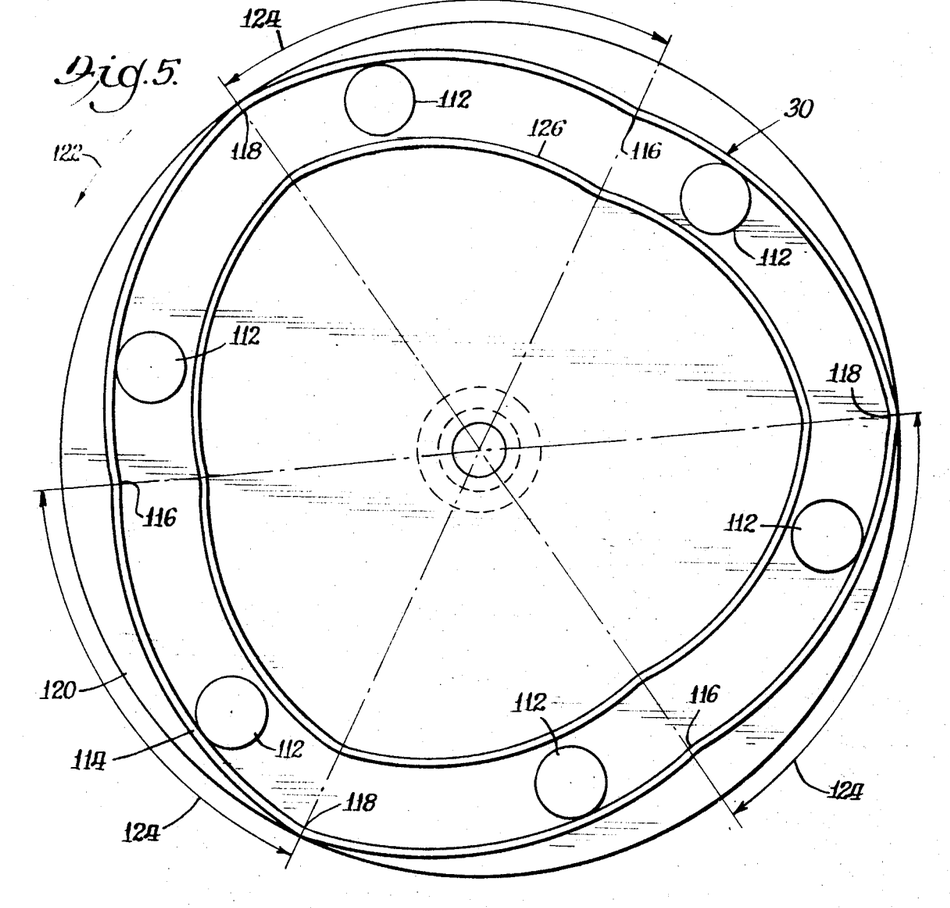
FIG. 5 is a simplified sectional view corresponding generally to the section of FIG. 2, but with most parts removed to better reveal the continuous operating cam means incorporated in the transmission.

A continuous, non-pulsating, constant speed power flow to the output shaft 24 for any one speed ratio selected from an infinite variation of speed ratios within a wide range of available ratios is assured without slippage or abrasive wear on the parts through usage of driving cams, denoted generally by the number 30, FIGS. 1, 2 and 5, which can be shaped through design to provide the desired non-fluctuating flow of power through the transmission to the output shaft 24.

For purposes of illustration, the one-way clutches 26 are depicted as sprag clutches respectively encircling three clutch input drive shafts 32 journalled by antifriction bearings 34, 36 in a support housing or casing for the transmission, denoted generally by the number 38. The output or driven side of each individual clutch 26 comprises a drum 40 encircling a circumferential series of one-way torque transmitting elements or sprags 42 which engage an inner driving drum or element 44 keyed to the corresponding clutch drive shaft 32.

The driven drum or output element 40, in the construction shown, is integral with a clutch output gear 46 which meshes, as do the output gears 46 of all three clutches 26, with a common pinion 48 coaxial with the transmission output shaft 24.

In the transmission 20 illustrated, which provides, as will presently appear, for selective reversal of the direction of rotation of the output shaft 24, the pinion 48 is journalled by an antifriction bearing 50 on the output shaft 24.

Figure 6:
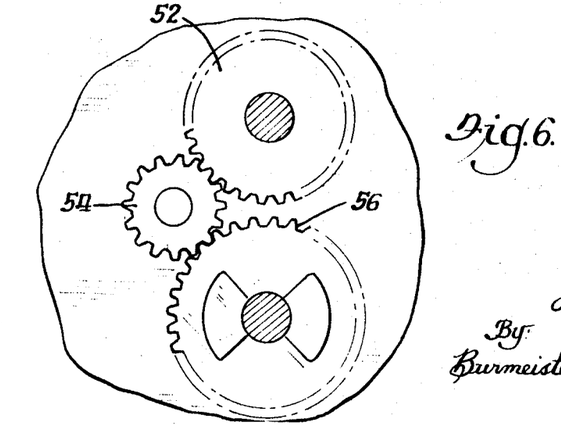
FIG. 6 is a fragmentary sectional view taken generally with reference to the line 6—6 in FIG. 1 and showing back gearing used in obtaining a selective reversal in the output speed of the transmission.

The end of each clutch output member or drum 40 opposite from the integral gear 46 is integral with a pinion 52, FIG. 1, which is connected through a back gear 54, as shown in FIG. 6, to a second pinion 56 journalled by an antifriction bearing 60 on the output shaft 24. In the construction illustrated, the gears 52 are smaller in diameter than the gears 46 with a consequence that a reversal in the direction of rotation of the output member 24, as will be described, also effects a change in the speed ratio between the driven shaft 24 and the driving shaft 22, the smaller gears 52 driven by all the clutches 26 being respectively connected through similar back gears 54 with the common pinion 56.

The two pinions 48, 56 disposed in coaxial relation to the output shaft 24 and continuously driven in opposite directions relative to each other are fixed respectively to two axially spaced positive clutch faces 62, 64 rotatably encircling the shaft 24. An axially shiftable clutch disc 66 is drivingly supported on the shaft 24 between the clutch elements 62, 64, as by means of splines 68. Opposite faces of the clutch element 66 carry axially projecting dogs 70 so that axial shifting movement of the clutch element 66, as by means of a control 72 illustrated in phantom in FIG. 1, brings the clutch element 66 into driven engagement selectively with either the pinion 48 or the pinion 56 to effect connection of the output sides or drums 40 of all the one-way clutches 26 with the driven member 24 to drive the latter, as will appear, in a desired direction of rotation.

As previously intimated, the input sides of the three one-way clutches 26 are oscillated in synchronism by the respective mechanical oscillators 28 with the input oscillatory motions of the three cluthces displaced in phase in relation to each other so that a continuous mechanical drive to the rotary output member or shaft 24 is maintained without interruption, as will presently appear.

As shown in FIGS. 1 and 2, the lefthand end of each oneway clutch input shaft 32, with respect to FIG. 1, is keyed to a drive pinion or sector gear 74, the three sector gears being disposed, as best shown in FIG. 2, in a triangular pattern about the output shaft 24. The input pinions or sector gears 74 for oscillating the clutches 26 mesh respectively with three reciprocable driving racks 76 extending diagonally across the output shaft 24, as shown in FIGS. 1 and 2, the successive racks 76 being disposed at 60° radial angles relative to each other so that the racks are evenly spaced angularly, as shown in FIG. 2.

Figure 3:
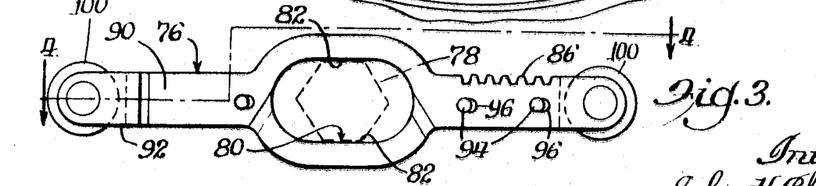
FIG. 3 is a longitudinal side view of one of a plurality of translatable racks incorporated in the transmission.

The individual racks 76 are guided in the construction shown for longitudinal reciprocation by means of a six-sided guide 78 coaxial with the output shaft 24 and having the overall shape as shown in FIG. 2 of a hexagon nut. The hexagon-shaped guide 78 is slidably embraced on opposite sides by each rack 76, the medial portion of each rack 76 being laterally widened as shown in FIGS. 1 and 3 and centrally apertured to form an oblong central opening 80, FIG. 3, defining two interior, parallel guide surfaces 82, mutually confronting each other to slidably engage a corresponding pair of flat guide surfaces 84 on the guide 78 illustrated in phantom in FIG. 3.

Figure 4:
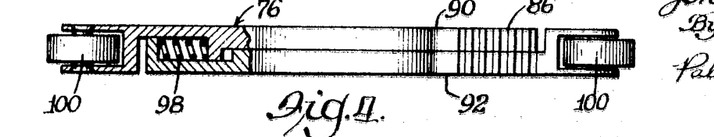
FIG. 4 is a partially sectioned longitudinal view of the rack of FIG. 3 taken generally with reference to the line 4—4 of FIG. 3.

Each rack defines a linear series of gear teeth 86 which mesh with teeth 88 of the coacting sector gear 74. To avoid any necessity of cutting the comating gears with precision and at the same time eliminate backlash between the meshing gears, each rack 76 can be formed in two longitudinal overlapping sections 90, 92, as illustrated in FIGS. 3 and 4. The two rack sections 90,92 are held in slidable relation to each other by pins 94 extending into elongated openings 96 which allow limited longitudinal displacement of the rack sections relative to each other. The linear gear teeth 86 of each rack extend transversely across and are formed structurally by both rack sections 90, 92.

A compression spring 98 fitted between the rack sections 90,92, as shown in FIG. 4, urges the rack sections longitudinally relative to each other so that the portions of the rack teeth 86 formed on the respective rack sections 90, 92 are continuously urged firmly against opposite sides of the comating teeth 88 on the corresponding sector gear 74 to effectively eliminate lost motion between the rack and sector gear.

Opposite ends of each rack 76 are shaped and fitted to rotatably carry rack actuating rollers 100 which confront, as best shown in FIG. 2, coacting cam follower levers 102, a pair of cam following levers 102 being provided for each rack 76. The six cam following levers 102 extend circumferentially in a common direction as shown in FIG. 2, being spaced somewhat from each other.

Each cam following lever 102 is swingably supported at one end by a pivot 104 and constitutes a mechanical oscillator. The six pivots 104 for the respective levers 102 are evenly spaced circumferentially from each other and supported on a rotatably adjustable cam follower support cage or plate 106 coaxial with the output shaft 24. As shown, the cam follower support 106 is journalled in concentric relation to the shaft 24 by antifriction bearings 108, FIG. 1, for rotary adjustment by means of a radially extending speed ratio adjustment handle 110 fixed to the cam follower support and extending radially through the transmission housing 38, as shown in FIGS. 1 and 2.

The end of each cam follower lever or oscillator 102 opposite from its support pivot 104 carries a cam follower roller 112 confronting encircling cam means 114 having a particular character and shape to be described.

As shown best in FIG. 5, the cam 114 is circumferentially continuous and undulates radially through three cycles, each having a radial angle of 120° within the angular compass of a single revolution or turn. Thus, the cam 114 extends continuously through a succession of three equally spaced apices or radial low points 116 and a corresponding number of radial high points 118 intervening successively between the low points 116.

The cam 114 extends axially from a rotary cam support disc 120 fixed, as shown in FIG. 1, to the driving member or input shaft 22 of the transmission. It can be assumed that the input shaft 22 and the cam 114 rotate in a counterclockwise direction with reference to FIG. 5 as indicated by the arrow 122.

As shown best in FIGS. 2 and 5, the six cam following rollers 112 are spaced circumferentially along the inwardly facing cam 114 in an annular array so that as the cam is driven counterclockwise in FIG. 5 by the input shaft 22 a number of the rollers 112 are forced in a radially inward direction as they travel along cam follower advancing segments or sectors 124 of the cam 114, which sectors rise radially inward between the respective radially outward low points 118 and the trailing cam apices or radially inward high points 116. At the same time, the other cam following rollers 112 are caused to track intervening cam follower return segments of the cam 114, as will presently appear, and move radially outward.

It is evident that the cam follower roller support levers 102 supporting the inwardly moving rollers 112 are swung radially inward while the intervening levers 102 supporting the outwardly moving cam follower rollers 112 are caused to swing radially outward.

The circumferential spacing of the six cam follower levers 102 and the angular displacement of the three translatable racks 76 is such that when the cam follower lever 102 confronting the roller 100 on one end of a rack 76 is being swung inwardly the other cam follower lever 102 confronting the roller 100 on the opposite end of the same rack is caused to swing simultaneously in an outward direction. Thus placed in intervening relation to a pair of cam follower levers 102 which are forced by the undulating cam 114 to swing in synchronism in in-and-out directions alternately, each rack 76 is caused to reciprocate longitudinally along its previously mentioned central guide 78.

To assure close tracking of each cam follower roller 112 with the endless cam 114 at all times, an endless return cam 126 is also carried by the drive disc 120 in radially inward spaced relation to the power cam 114, as shown in FIGS. 1 and 5. The inner cam 126 has a general shape corresponding to that of the power cam 114. Each cam follower lever 102 carries a lever return roller 128, FIG. 1, journalled on the free end of the lever 102 in coaxial relation to the roller 112. The rollers 128 follow the return cam 126 and cause the rollers 112 to closely track the endless power cam 114 even when the transmission is adjusted to deliver a zero output speed as will be described.

Upon rotation of the input shaft or driving member 22, all the cam following levers 102 oscillate in synchronism through a predetermined angle of displacement determined by the radial extent of the undulations of the power cam 114, the angles of radial displacement of the levers 102 remaining unchanged for all speeds of rotation of the input shaft 22 and all speed adjustments of the transmission.

As indicated, the output speed of the driven member 24 is infinitely adjustable through a wide speed range in relation to the speed of the input driving shaft 22. Adjustment of the speed ratio of the transmission is effected by controlled movement of the speed adjusting handle 110 to rotatably adjust the support cage or disc 106 for the cam lever pivots 104 while the reciprocable racks 76 are held against rotation by the hexagon-shaped guide 78 received within all the racks 76.

FIG. 2 shows the transmission adjusted by the handle 110 to bring the lever following rollers 100 on the reciprocable racks 76 into circumferential alignment with the axes of the support pivots 104 for the oscillating levers 102. With the transmission adjusted in this manner, oscillations of the levers 102 do not cause displacement of the rollers 100 engaging the ends of the levers 102 aligned with and supported by the pivots 104. As a consequence, the racks 76 remain stationary and the output speed of the driven member 24 is zero.

Rotary displacement of the follower lever support 106 by the handle 110 in the clockwise direction, as indicated by the arrow 130, shifts the levers 102 clockwise in relation to the coacting rollers 100 on the racks 76 with the consequence that the rollers 100 engage segments of the levers 102 which oscillate through arcs having a length dependent upon the degree of angular adjustment of the adjustable support 106 away from the zero output speed position shown in FIG. 2.

Engagement of the rollers 100 with portions of the levers 102 which actively swing causes the racks 76 to reciprocate, oscillating the sector gears 76 in synchronism but in phases of oscillatory motion which are displaced in relation to each other for the several sector gears 74.

The three one-way clutches 26 function to transmit the forward phases of oscillatory motion of the respective sector gears 74 into forward advancement of the output shaft 24. By reason of the phase displacement of the oscillatory motions applied to the inputs of the several clutches 26, the output member 24 is driven continuously through one or another of the one-way clutches 26.

Moreover, the transmission of power and motion to the driven member 24 is not only continuous but positive by reason of the positive mechanical oscillation of the follower levers 102, the positive drive of the reciprocating racks 76 and the positive nonslip transmission of torque through the individual one-way clutches.

Moreover, the slope of the power cam 114 along the power sectors 124 extending between the low points of outer displacement 118 and the trailing apices 116 of maximum inner displacement can be shaped through design so that the speed of motion transmitted through the interconnecting linkage from the active cam surface to the output member 24 is a constant speed in terms of rotary speed of the output member. The inherent suitability of the cam surfaces to be shaped through design achieves the desired constant speed, positive drive to the output member 24 without speed or power pulsations.

The fact that the cam lever support 106 can be infinitely adjustable within its angular range of adjustable displacement coupled with the fact that the positions of contact of the rack rollers 100 with the cam following levers 102 is correspondingly infinitely adjustable along the levers 102 provides the desired infinite adjustment of the output speed of the driven member 24 relative to the driving member 22 while continuously maintaining a positive drive without slippage and without speed pulsations to the driven member. The drive is achieved efficiently with no loss or absorption of power in the transmission due to a change in the speed ratio as such.

The transmission casing 38 can be readily sealed and filled with oil to protect the working parts. The handle 110 is merely illustrative of controls that can be used to rotatably adjust the speed control disc or support 106 for the levers 102.

Figure 7:
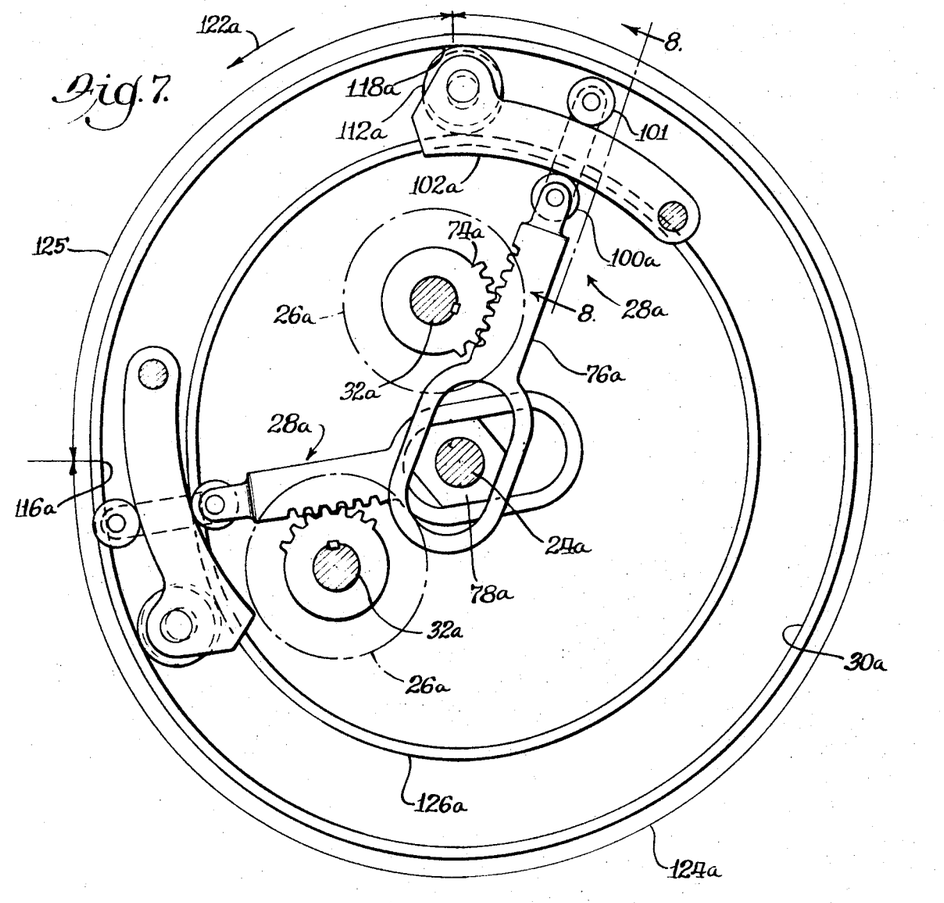
FIG. 7 is a simplified transverse sectional view taken with reference to the line 2—2 of FIG. 1, but illustrating a modified construction using only two cam actuated oscillators.
Figure 8:
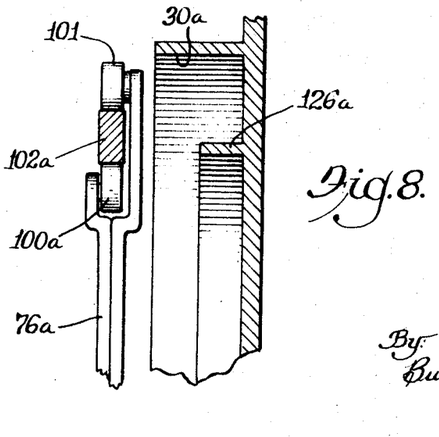
FIG. 8 is a simplified transverse sectional view of the modified construction taken generally with reference to the line 8—8 of FIG. 7.

In the modified construction illustrated in FIGS. 7 and 8, component elements corresponding to those described in relation to the form shown in FIGS. 1 through 6 are identified with the same reference numbers except with the addition of the suffix a.

The modified transmission 20a, illustrated in FIGS. 7 and 8, provides a continuous drive to the rotary output member 24a, utilizing for this purpose only two mechanical oscillators 28a driving respectively two input shafts 32a connected through one-way clutches to the output shaft 24a as in the previously described transmission.

To provide a continuous flow of power at a constant driving speed to the output shaft 24a using only two mechanical actuators 28a and two coacting one-way clutches, the endless driving cam 30a of the transmission 20a is shaped to cycle the cam following lever 102a of each oscillator 28a only once for each revolution of the cam 30a. To assure the desired continuity of power flow at a constant speed to the driven member, the endless cam 30a is shaped to have an inwardly rising power driving portion or advancing segment 124a extending substantially more than 180°, in this instance 270°, in a clockwise direction with reference to FIG. 7 from a radially outward low point 118a to a radially inward high point 116a.

Normally, the cam 30a is turned in a counterclockwise direction with reference to FIG. 7, as indicated by the arrow 122a, thus causing the power driving roller 112a on the cam following lever or oscillator 102a of an individual actuator 28a to swing radially inward as the input driving cam 30a turns counterclockwise through three-quarters of a revolution. This power driving motion of an individual lever 102a produces a corresponding power translation of the coacting rack 76a driving the corresponding sector gear 74a to transmit power to the driven member 24a while the input drive shaft 22a is turning three-quarters of a revolution, a constant output speed of the driven shaft 24a being assured by the shaping of the driving cam surface 30a along the 270° driving sector 124a.

At this point, it should be noted that each individual cam following lever 102a is swung outwardly to the radially outward low point 118a as the rotary movement of the cam 30a continues through an additional one-quarter revolution during which the individual roller 112a moves along a 90° sector 125 of the cam 30a wherein the cam moves out dynamically from the center of rotation of the cam.

While the driving roller 112a of an individual actuator 28a is moving along the outwardly receding, 90° sector 125 of the cam 30a, the continuous flow of power through the output member 24a is maintained by operation of the other one of the two actuators 28a. To assure a desired overlap in power flow to the driven member 24a from the two actuators 28a, the two actuators are angularly displaced relative to each other so that the displacement of the driving rollers 112a on the two oscillators 102a is, with reference to the previously-described layout of the cam 30a, greater than 180° and less than 270° so that one or the other of the two cam following rollers 112a of the respective oscillators is continuously engaged with the inwardly rising portion 124a of the cam 30a.

As shown in FIGS. 7 and 8, each rack 76a is driven inwardly in a power stroke by a roller 100a journalled on the rack and engaging the inner side of the corresponding follower lever 102a. Each rack 76a is returned outwardly by a second roller 101 journalled on an extension of the rack 76a, as shown in FIG. 8, and engaging the outer side of the same follower lever 102a. If desired, each rack 76a may be formed in longitudinally split sections carrying the respective rollers 100a and 101 and biased by a spring, if desired, generally in the same manner as the individual racks 76 previously described to eliminate lost motion between the cam following levers 102a and the corresponding sector gears 74a.

The invention is claimed as follows:

1. An infinitely variable speed, mechanical transmission comprising a rotary driving member, a rotary driven member, endless cam means connected with said driving member for rotation by the latter, a cam follower support adjustable rotatably in generally concentric relation to the axis of rotation of said endless cam means, a plurality of cam follower levers, pivots swingably supporting said respective follower levers on said cam follower support, a plurality of cam followers coacting with said follower levers in spaced relation to said support pivots therefor and coacting with said cam means to effect oscillation of said follower levers as an incident to rotation of said cam means, a plurality of translatable racks interconnected with said respective levers at positions thereon with respect to said pivots therefor determined by the instantaneous rotary adjustment of said cam follower support so that said racks are reciprocated as an incident to oscillation of said follower levers to a degree proportional to the spacing from said lever support pivots of the positions of interaction between said racks and said follower levers, a plurality of pinions meshing with said respective racks for oscillation by the latter through angles of oscillation determined by the rotary adjustment of said cam follower support, a plurality of one-way clutches having inputs connected with said respective pinions, transmission means continuously connecting the outputs of all said clutches with said driven member so that the driven member is rotated at a speed in relation to said driving member determined by the instantaneous position of rotary adjustment of said cam follower support, and transmission speed control means connected with said cam follower support to effect an infinitely variable rotary adjustment of the latter and a consequent infinitely variable adjustment of the speed of rotation of said driven member in relation to the rotary speed of the driving member.

2. An infinitely variable speed, mechanical transmission comprising a rotary driving member, a rotary driven member, cam means connected with said driving member for movement by the latter, a plurality of cam follower levers, pivots swingably supporting said respective follower levers, a plurality of cam followers coacting with said follower levers in spaced relation to said support pivots therefor and coacting with said cam means to effect oscillation of said follower levers as an incident to movement of said cam means, a plurality of racks interconnected with said respective levers at positions thereon adjustable along the levers with respect to said pivots therefor, means for adjusting infinitely relative to each other said racks and said lever support pivots to effect a corresponding adjustment along said levers of the positions of interaction between said racks and said follower levers so that the racks are moved as an incident to oscillation of said follower levers to a degree proportional to the spacing from said lever support pivots of the positions of interaction between said racks and said follower levers, a plurality of gears meshing with said respective racks for oscillation by the latter, and a plurality of one-way clutches connecting said respective gears with said driven member so that the driven member is rotated at a speed in relation to said driving member determined by the instantaneous positions of relative adjustment of said racks and said lever support pivots.

3. An infinitely variable speed, mechanical transmission comprising a rotary driving member, a rotary driven member substantially coaxial with said driving member, endless cam means connected with said driving member for rotation by the latter, a lever support adjustable rotatably in generally concentric relation to the axis of rotation of said endless cam means, a plurality of pairs of cam follower levers, pivots swingably supporting said respective follower levers on said lever support with the two levers of each pair disposed generally on opposite sides of the substantially common axis of said driving and driven members, a plurality of cam followers coacting with said follower levers in spaced relation to said support pivots therefor and coacting with said cam means to effect oscillation of said follower levers as an incident to rotation of said cam means, a plurality of translatable racks corresponding to the respective pairs of said follower levers, each rack extending transversely with respect to said common axis and having rollers at opposite ends engaging the two follower levers of the corresponding pair, means for adjusting infinitely in relation to each other said lever support and said racks to infinitely adjust along said levers the positions of engagement therewith of said rack rollers and consequently adjust infinitely the degree to which the racks are reciprocated as an incident to oscillation of the follower levers, a plurality of gears meshing with said respective racks for oscillation by the latter through angles of oscillation determined by the rotary adjustment of said lever support, a plurality of one-way clutches having inputs connected with said respective gears, and transmission means continuously connecting the outputs of all said clutches with said driven member so that the driven member is rotated at a speed in relation to said driving member determined by the instantaneous position of rotary adjustment of said lever support, and said cam followers being oriented to said cam means and to said driving member to maintain a predetermined displacement in phase in the input driving motions to said several clutches.

4. An infinitely variable speed, mechanical transmission according to claim 3 in which the output of each one-way clutch is geared to a first clutch member journalled in concentric relation to said driven member, said one-way clutches are connected through back gear means to a second clutch member journalled in concentric relation to said driven member for continuous rotation in a direction opposite to the direction of rotation of said first clutch member, and a third clutch member is connected in driving relation to said driven member for selective movement into driven relation to either said first clutch member or said second clutch member for driving said driven member through the transmission selectively in opposite directions at speeds infinitely variable relative to the speed of said driving member.

5. An infinitely variable speed, mechanical transmission according to claim 4 in which each rack is formed in two sections biased longitudinally relative to each other and having in each rack section teeth meshing with the coacting gear to eliminate lost motion between the rack and the gear.

6. For transmitting driving torque to a driven rotary output from a driving rotary input at a speed which is, in relation to the speed of the rotary driving input, infinitely variable by adjustment and constant for all conditions of adjustment, a positive drive mechanical transmission which maintains continuously a positive mechanical driving connection between the driving rotary input and the driven rotary output and which comprises, a rotary driving member forming the rotary input to the transmission, endless driving cam means connected to said driving member for rotation thereby, said cam means comprising a cam follower advancing segment thereof and a cam follower return segment thereof disposed in mutually intervening relation around the cam means, a plurality of cam follower elements coacting with said cam means for cyclic advancement and return by the rotating cam means in synchronism with movement of said advancing and return segments of the cam means past the respective follower elements, a plurality of oscillator support pivots, a plurality of oscillators swingably supported on said respective pivots and extending therefrom, said cam follower elements being connected to said respective oscillators to oscillate the latter about said pivots through constant angular excursions upon rotation of said driving member, a plurality of one-way rotary clutches, a rotary driven member forming the rotary output of the transmission, mechanical transmission means continuously connecting the output sides of all said one-way clutches in positive driving relation to said driven member; clutch driving elements connecting the inputs of said respective one-way clutches to said respective oscillators at actuating positions with reference to the oscillators that are adjustable along the latter toward and away from said pivots therefor to effect, upon power driven oscillation of the oscillators by said driving member, power driven oscillation of the inputs of the respective one-way clutches through angular excursions that are proportional to the spacings from said pivots of the actuating positions at which said clutch driving elements are connected to the respective oscillators; said cam follower elements being oriented in relation to said cam means so that a follower element engaged with a follower advancing segment of the rotating cam means moves in a direction to transmit driving motion through the corresponding one-way clutch to the driven member from the driving member; each follower advancing segment of the cam means being shaped in relation to the motion relationships of the power train from the advancing segment to the driven member through the coacting cam follower element, oscillator, clutch driving element and one-way clutch so that for any actuating position at which the corresponding clutch driving element is located in relation to the coacting oscillator the rotary displacement of the driven member remains constant in relation to the rotary displacement of the driving member as long as the follower advancing segment is acting through a coacting follower element to turn the driven member; and transmission speed ratio adjusting means interconnected between said pivots and said clutch driving elements to adjust the actuating positions of the interconnections between said clutch driving elements and said oscillators progressively toward or away from said pivots to effect infinite adjustment of the angular excursions of the inputs of said respective clutches and hence infinite adjustment of the output speed of said driven member relative to the input speed of said driving member.

7. A positive drive mechanical transmission according to claim 6, in which said cam follower elements are so oriented and positioned in relation to the cam means that at least one of the cam follower elements is in active engagement with an advancing segment of the cam means for all rotary positions of the cam means to actively transmit driving motion from the driving member through the transmission to the driven member.

8. A positive drive mechanical transmission according to claim 7, in which a cam follower advancing segment of the cam means extends around the axis of the cam means through a radial angle substantially in excess of 180° and in which the cam follower elements of two oscillators are oriented for engagement in succession by said last-mentioned advancing segment and said last-mentioned advancing segment continuously engages at least one of the two follower elements last mentioned to continuously transmit driving movement through one or the other or both from said driving member to said driven member.

9. For transmitting driving torque to a driven rotary output from a driving rotary input at a speed which is, in relation to the speed of the rotary driving input, infinitely variable by adjustment, a positive drive mechanical transmission which maintains continuously a positive mechanical driving connection between the driving rotary input and the driven rotary output and which comprises, a rotary driving member forming the rotary input to the transmission, endless driving cam means connected to said driving member for rotation thereby, said cam means comprising a cam follower advancing segment thereof and a cam follower return segment thereof disposed in mutually intervening relation around the cam means, a plurality of cam follower elements coacting with said cam means for cyclic advancement and return by the rotating cam means in synchronism with movement of said advancing and retracting segments of the cam means past the respective follower elements, a plurality of oscillator support pivots, a plurality of oscillators swingably supported on said respective pivots and extending therefrom, said cam follower elements being connected to said respective oscillators to oscillate the latter about said pivots through constant angular excursions upon rotation of said driving member, a plurality of one-way rotary clutches, a rotary driven member forming the rotary output of the transmission, mechanical transmission means continuously connecting the output sides of all said one-way clutches in positive driving relation to said driven member; clutch driving elements connecting the inputs of said respective one-way clutches to said respective oscillators at actuating positions with reference to the oscillators that are adjustable along the latter toward and away from said pivots therefor to effect, upon power driven oscillation of the oscillators by said driving member, power driven oscillation of the inputs of the respective one-way clutches through angular excursions that are proportional to the spacings from said pivots to the actuating positions at which said clutch driving elements are connected to the respective oscillators; and transmission speed ratio adjusting means interconnected between said pivots and said clutch driving elements to adjust the actuating positions of the interconnections between said clutch driving elements and said oscillators progressively toward or away from said pivots to effect infinite adjustment of the angular excursions of the inputs of said respective clutches and hence infinite adjustment of the output speed of said driven member relative to the input speed of said driving member.

10. A positive drive mechanical transmission according to claim 9, in which said cam follower elements are so oriented and positioned in relation to the cam means that at least one of the cam follower elements is in active engagement with an advancing segment of the cam means for all rotary positions of the cam means to actively transmit driving motion from the driving member through the transmission to the driven member.

11. A positive drive mechanical transmission according to claim 9, in which a cam follower advancing segment of the cam means extends around the axis of the cam means through a radial angle substantially in excess of 180° and in which the cam follower elements of two oscillators are oriented for engagement in succession by said last-mentioned advancing segment and said last-mentioned advancing segment continuously engages at least one of the two follower elements last mentioned to continuously transmit driving movement through one or the other or both from said driving member to said driven member.

* * * * *